United States Patent
Hu et al.

(10) Patent No.: US 11,194,773 B2
(45) Date of Patent: Dec. 7, 2021

(54) INTEGRATION OF EXISTING DATABASES INTO A SHARDING ENVIRONMENT

(71) Applicant: Oracle International Corporation, Redwood Shores, CA (US)

(72) Inventors: Wei-Ming Hu, Palo Alto, CA (US); Ghazi Nourdine Benadjaoud, Pleasanton, CA (US); Mark Dilman, Sunnyvale, CA (US); Darshan Maniyani, Union City, CA (US); Sachin Rathod, San Mateo, CA (US); Wumengjian Zhu, Sunnyvale, CA (US)

(73) Assignee: Oracle International Corporation, Redwood Shores, CA (US)

(*) Notice: Subject to any disclaimer, the term of this patent is extended or adjusted under 35 U.S.C. 154(b) by 136 days.

(21) Appl. No.: 16/569,051

(22) Filed: Sep. 12, 2019

(65) Prior Publication Data
US 2021/0081378 A1 Mar. 18, 2021

(51) Int. Cl.
- G06F 16/21 (2019.01)
- G06F 16/22 (2019.01)
- G06F 16/25 (2019.01)
- G06F 16/2455 (2019.01)

(52) U.S. Cl.
CPC .......... *G06F 16/212* (2019.01); *G06F 16/221* (2019.01); *G06F 16/2282* (2019.01); *G06F 16/2455* (2019.01); *G06F 16/256* (2019.01)

(58) Field of Classification Search
CPC ............... G06F 16/212; G06F 16/2282; G06F 16/256; G06F 16/2455; G06F 16/221
See application file for complete search history.

(56) References Cited

U.S. PATENT DOCUMENTS

| | | |
|---|---|---|
| 8,332,207 B2 | 12/2012 | Brants |
| 8,700,683 B2 | 4/2014 | Cooney |
| 8,819,068 B1 | 8/2014 | Knote |
| 8,903,871 B2 | 12/2014 | Hwang |
| 8,965,921 B2 | 2/2015 | Gajic |
| 9,122,532 B2 | 9/2015 | Kosuru |
| 9,128,965 B1 | 9/2015 | Yanacek |
| 9,135,269 B2 | 9/2015 | Shetty |
| 9,396,275 B2 | 7/2016 | Sandholm |
| 9,633,051 B1 | 4/2017 | Maccanti |
| 9,659,040 B1 | 5/2017 | Bellingan |
| 9,875,272 B1 * | 1/2018 | Jhingran ............... G06F 16/278 |

(Continued)

FOREIGN PATENT DOCUMENTS

WO WO 2016/172195 A1 10/2016

OTHER PUBLICATIONS

Hu, U.S. Appl. No. 5/267,395, filed Sep. 16, 2016, Office Action, dated Jul. 11, 2018.

(Continued)

*Primary Examiner* — Dangelino N Gortayo
(74) *Attorney, Agent, or Firm* — Hickman Becker Bingham Ledesma LLP (57) ABSTRACT

Techniques described herein create a sharding environment from existing independent databases, use the sharding environment to issue cross shard queries, create "on all shards" new objects, and create and "on all shards" new users that will have permission to access the data across all database shards.

28 Claims, 7 Drawing Sheets

(56) References Cited

U.S. PATENT DOCUMENTS

| | | |
|---|---|---|
| 10,198,495 B1 | 2/2019 | Bailey |
| 2005/0038801 A1 | 2/2005 | Colrain et al. |
| 2011/0196855 A1 | 8/2011 | Wable |
| 2012/0254175 A1 | 10/2012 | Horowitz et al. |
| 2012/0278323 A1 | 11/2012 | Chattopadhyay |
| 2014/0101100 A1 | 4/2014 | Hu et al. |
| 2014/0122510 A1 | 5/2014 | Namkoong |
| 2014/0156632 A1 | 6/2014 | Yu |
| 2014/0324910 A1 | 10/2014 | De Lavarene et al. |
| 2014/0372702 A1 | 12/2014 | Subramanyam |
| 2015/0026213 A1 | 1/2015 | Hedge et al. |
| 2015/0089514 A1 | 3/2015 | Grewal |
| 2015/0154200 A1 | 6/2015 | Lightner |
| 2015/0227521 A1 | 8/2015 | Levari |
| 2015/0254307 A1 | 9/2015 | Johnson |
| 2015/0254325 A1 | 9/2015 | Stringham |
| 2015/0293945 A1 | 10/2015 | Amrhein |
| 2016/0171511 A1 | 6/2016 | Goel |
| 2016/0191509 A1 | 6/2016 | Bestler |
| 2016/0306832 A1 | 10/2016 | Hegde et al. |
| 2016/0306854 A1 | 10/2016 | Hegde et al. |
| 2017/0083598 A1 | 3/2017 | Guney |
| 2017/0103092 A1 | 4/2017 | Hu et al. |
| 2017/0103094 A1 | 4/2017 | Hu |
| 2017/0103098 A1 | 4/2017 | Hu |
| 2017/0103116 A1 | 4/2017 | Hu |
| 2017/0371910 A1* | 12/2017 | Joo ................... G06F 16/2329 |
| 2018/0329931 A1* | 11/2018 | Baid .................. G06F 9/45541 |
| 2019/0121902 A1* | 4/2019 | Ryan .................... G06F 16/212 |
| 2019/0179943 A1* | 6/2019 | Yang .................... G06F 16/252 |
| 2020/0364363 A1* | 11/2020 | Vanover ............... H04L 63/104 |
| 2021/0042284 A1* | 2/2021 | Kanthak ............ G06F 16/2358 |

OTHER PUBLICATIONS

Hu, U.S. Appl. No. 15/268,438, filed Sep. 16, 2016, Office Action, dated Sep. 6, 2018.

Hu, U.S. Appl. No. 15/268,438, filed Sep. 16, 2016, Notice of Allowance, dated Feb. 12, 2019.

Hu, U.S. Appl. No. 15/268,318, filed Sep. 16, 2016, Office Action, dated Jan. 14, 2019.

Hu, U.S. Appl. No. 15/268,318, filed Sep. 16, 2016, Notice of Allowance, dated Jul. 3, 2019.

Hu, U.S. Appl. No. 15/268,318, filed Sep. 16, 2016, Final Office Action, dated Apr. 17, 2019.

Hu, U.S. Appl. No. 15/268,108, filed Sep. 16, 2016, Office Action, dated Sep. 17, 2018.

Hu, U.S. Appl. No. 15/268,108, filed Sep. 16, 2016, Notice of Allowance, dated Jan. 28, 2019.

Hu, U.S. Appl. No. 15/267,395, filed Sep. 16, 2016, Notice of Allowance, dated Dec. 3, 2018.

* cited by examiner

INTEGRATION OF EXISTING DATABASES INTO A SHARDING ENVIRONMENT

CROSS-REFERENCE TO RELATED APPLICATIONS

This application is related to U.S. patent application Ser. No. 15/267,395, entitled "Relational Database organization for Sharding," U.S. patent application Ser. No. 15/268,108, entitled "Request Routing and Query Processing in a Sharded Database," U.S. patent application Ser. No. 15/268,318, entitled "DDL Processing in Sharded Databases," and U.S. patent application Ser. No. 15/268,438, entitled "Composite Sharding," wherein the entire contents of which are hereby incorporated by reference as if fully set forth herein.

TECHNICAL FIELD

The present disclosure relates to database systems. More specifically, the disclosure relates to integration of existing databases into a sharding environment.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Global companies run multiple instances of packaged applications in different geographic regions for performance and for meeting data residency requirements. These databases have almost identical schemas with common information duplicated in the regions. Customers prefer to replace such siloed databases with a single logical database spanning geographic regions as this would allow them to seamlessly query and update data across the regions. This single logical database can be achieved by making the regional siloed databases database shards of a sharded database. Migrations from a set of independent databases to a traditional sharded database requires unification of database schema, giving up management autonomy of individual databases and performing massive data migration. Such migrations are disruptive for any company and may violate business requirements.

Therefore, there is a need for a solution to integrate existing component databases into a federated sharded database without disruption to the component databases.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

General Overview

Horizontal partitioning is a technique of decomposing a single larger table into smaller, more manageable subsets of information, called "partitions." Sharding is a data tier architecture where database data is horizontally partitioned across independently managed database instances and/or database management systems (DBMSs), where each independently managed database is referred to as a "database shard." Partitioned data are stored in separate tables across the database shards, where each table is referred to as a "table shard." A collection of database shards, together, makes up a single logical database which is referred to as a "sharded database." A collection of table shards, together, makes up a single logical table which is referred to as a "sharded table." A sharded database is logically treated as a single database and, thus, can be accessible to client applications just like an unsharded database.

Each database shard is independently managed by one or more database instances and/or DBMSs. A database instance managing a database shard does not have direct access to the persistent storage (e.g., files in a disk-based file system) that stores another database shard managed by another database instance. To access the other database shard, the database instance sends a request to the other database instance. The request may be in the form of, for example, a request to access one or more tables in the other database shard.

Approaches, referred to herein as federated database sharding, create a sharding environment from existing siloed or independent databases comprising pre-existing tables. A shard catalog defines each siloed database as a database shard in a shardspace, and defines an integrated or global schema, which defines a layout of the siloed databases. Importantly, the shard catalogue defines one or more sharded tables and columns and datatypes thereof. The shard catalog is essentially the data dictionary for the sharded database as a whole. Each shardspace includes a pre-existing table as a respective table shard for a sharded table.

A pre-existing table that is integrated as a table shard within a sharded table is referred to herein a federated table. In general, a federated table is created and may hold production data before being integrated as a table shard in sharded table.

The shard catalog server creates one or more user accounts in each database shard. The user accounts grant the shard catalogue server with a user account with access to each database shard.

Under federated database sharding, a sharded table is created in a "bottom-up" approach. By bottom-up, it is meant that the definition for the sharded table is created to mirror that of the federated tables in the database shards. The definition of the columns of the sharded table is also created to mirror that of the columns of the federated tables in the database shards.

A table name for a sharded table matches the table name of a respective table shard in a database shard or matches a synonym for a table name of the table shard defined for the table shard by the database shard. A synonym for a table name may be added to a database shard as part of preparing the database shard to support a table shard for the sharded table.

Similarly, a particular column in a sharded table matches the column name of a respective column in a table shard of a database shard or matches a synonym for a column name of the column defined by the database shard for the column. A synonym for a column name may be added to a database shard as part of preparing the database shard to support a table shard for the sharded table.

The shard catalog server identifies "heterogenous" columns in a table shard that do not exist in other table shard(s) or have column types that different from columns in other table shard(s). When queries that reference heterogeneous columns are received at the shard catalog server, the shard catalog server rewrites these queries to include a built-in handler function in place of the referenced heterogeneous columns such that database shards return appropriate values to the shard catalog server.

The global schema can be extended according to application needs. For example, since the siloed databases are now database shards, users may use functionalities of a sharded database, including functionalities to create new sharded and duplicated database objects.

Techniques described herein do not require migration of data, or changes to a global application, database schema, or the way the siloed databases are administered, when creating a federated sharded database, and thus do not introduce any disruption to the existing databases.

System of Existing Independent Databases

Figure 1:
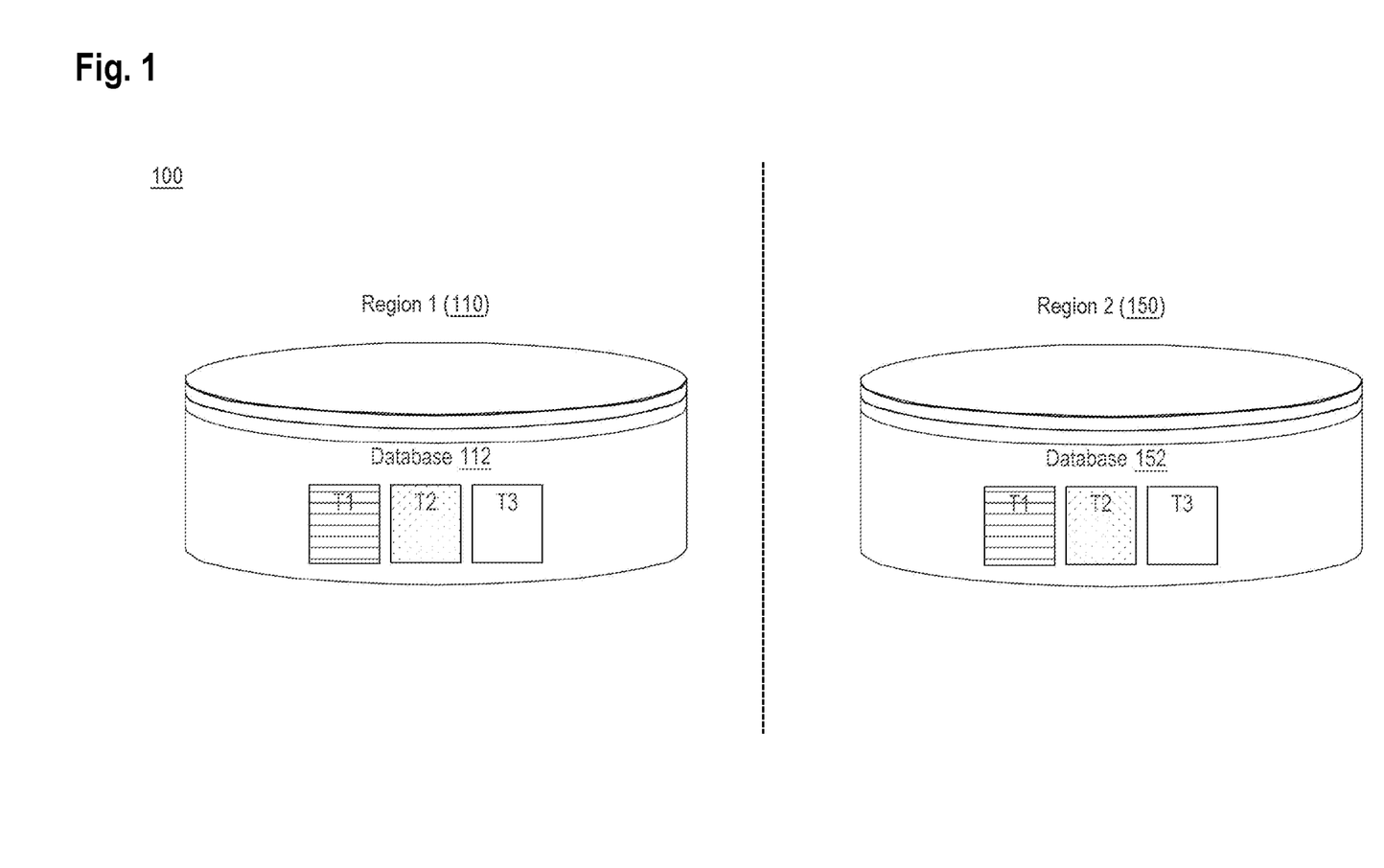
FIG. 1 illustrates a block diagram of example system of existing independent databases.

FIG. 1 illustrates a block diagram of example system 100 of existing independent databases. Two databases 112, 152 are in different locations or regions 110, 150. However, it is contemplated that the databases 112, 152 may be co-located in the same region. The databases 112, 152 may have the same or identical schema. Alternatively, the databases 112, 152 may have slightly different schemas. An example of databases having slightly different schemas is if a table has more or less columns in one of the databases, or if one or more columns of a table across the databases have different datatypes. In the example of FIG. 1, table T1 has slightly different schemas on the databases 112, 152, table T2 has the same schema but different contents on the databases 112, 152, and table T3 has the same content in the databases 112, 152.

Figure 2:
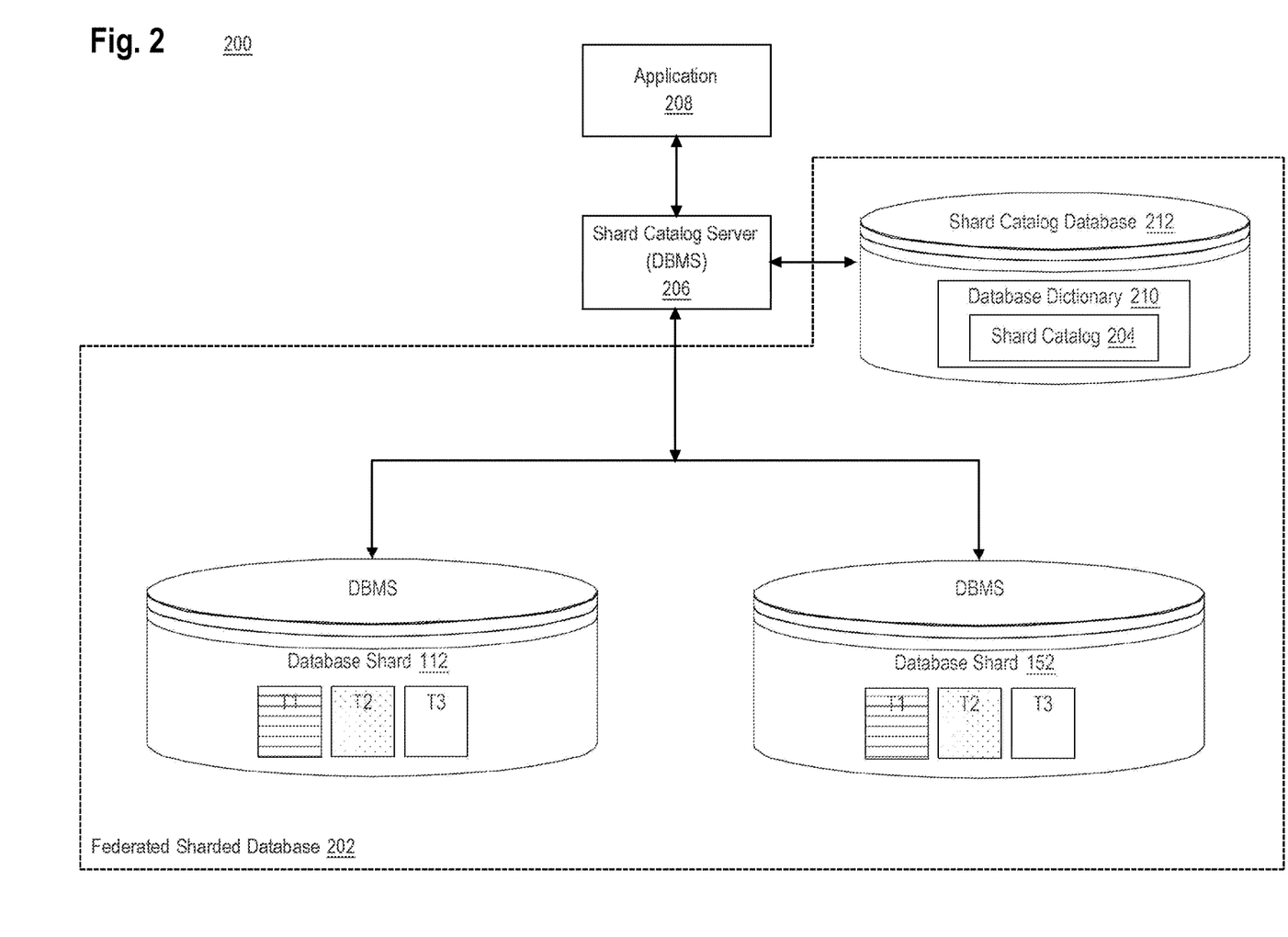
FIG. 2 is a block diagram of an example system of a sharding environment including existing databases, according to one embodiment.

Using the techniques described herein, the existing databases 112, 152 may be integrated into one sharding environment, as illustrated in FIG. 2, to enable seamless execution of queries across the existing databases 112, 152. Any number of regions and any number databases may be involved in an integration into one sharding environment. Two regions, each including a database, are shown in FIG. 1 merely for purposes of providing an illustrative example.

Sharding Environment Including Existing Independent Databases

FIG. 2 is a block diagram of an example system 200 of a sharding environment including existing independent databases, according to one embodiment. Example existing independent databases are databases 112, 152 of FIG. 1.

Client application 208 is any sort of client application that requires access to data stored in a database. In an embodiment, client application 208 may be a client in an OLTP (online transactional processing) setting, such as e-commerce, mobile, social, or SaaS (software as a service). The client application 208 is communicatively coupled to a federated sharded database 202.

The federated sharded database 202 comprises a logical database where data is located across existing databases 112, 152. Each existing database 112, 152 is a database shard in the federated sharded database 202. The federated sharded database 202 may include any number of database shards. Each of the database shards 112, 152 remains its own independent database that does not need to share physical resources, such as processors, memory, and/or storage device, with other database shards in the federated sharded database 202. In an embodiment, each of the database shards 112, 152 is hosted by a respective DBMS (database management system) shard of a plurality of DBMS shards.

The federated sharded database 202 may comprise a shard catalog 204. The shard catalog 204 is a special part of a database dictionary 210 that is used to store configuration data for the federated sharded database 202. In an embodiment, the database dictionary 210 is maintained in a shard catalog database 212.

In an embodiment, the shard catalog 204 can be replicated to provide improved availability and scalability. Configuration data that is stored in the shard catalog 204 may include: shard topology data that describes the overall configuration of the federated sharded database 202, information about the configuration of the database shards 112, 152, information about the configuration of a shard catalog server 206, information about the client application 208, a global schema based on local schemas of data that is located in database shards 112, 152, historical logs of pending and completed schema modification instructions for the database shards 112, 152, and all other information related to the configuration of the federated sharded database 202.

Federated tables that have slightly different schemas, such T1, across the database shards 112, 152 are automatically indicated as "externally" sharded tables in the shard catalog 204. Federated tables that have the same schema but different contents, such T2, across the database shards 112, 152 are also automatically indicated as "externally" sharded tables in the shard catalog 204. Federated tables that have the same schema but the same content, such as T3, across the database shards 112, 152 are automatically indicated as "externally" duplicated tables in the shard catalog 204.

A shard catalog server 206 coordinates various functionalities across the federated sharded database 202, including, but not limited to: routing database requests to database shards, receiving local schemas from database shards for creating a global schema, creating and propagating user accounts to the database shards, monitoring status of database shards, receiving status updates from database shards, receiving notifications from client applications, sending notifications to database shards, sending notifications to client applications, and/or coordinating various operations that affect the configuration of the federated sharded database 202. The shard catalog server 206 is communicatively coupled to the shard catalog 204, the client application 208, and the database shards 112, 152. In FIG. 2, the shard catalog 204 is depicted as being separate from the shard catalog server 206. However, the shard catalog 204 may be included as part of the shard catalog server 206.

In addition, although depicted as a single shard catalog server 206 in FIG. 2, the federated sharded database 202 may include multiple shard catalog servers 206. For example, in an embodiment, federated sharded database 202 may include two shard catalog servers 206. Having multiple shard catalog servers 206 may allow for load balancing of the coordination tasks performed by the shard catalog servers 206, thereby improving performance. In the case of multiple shard catalog servers 206, in an embodiment, one of the shard catalog servers 206 may be selected as the manager of the shard catalog servers 206 that is responsible for managing the remaining shard catalog servers 206, including load balancing.

Once the existing databases 112, 152 are integrated as database shards of a federated sharded database, functionalities of a sharded database, such as the ability to create sharded and duplicated objects, become available. These newly created tables are not indicated as "externally" sharded or "externally" duplicated as these tables are user defined or created after integration of the existing databases 112, 152.

An advantage of the federated sharded database 202 is that the federated sharded database 202 provides a combination of centralized administration of data with local autonomy of existing database 112, 152. To meet data residency requirements, primary copies of the data reside with the existing databases 112, 152. Only metadata is exported. Since this metadata is common across all the existing databases 112, 152, it is not country-specific data.

Shardspace

In federated database sharding, each existing database (and its replica) may be defined as a shardspace. A shardspace may include one or more database shards of a federated sharding database. For example, in FIG. 2, database shard 112 belongs in a shardspace, while database shard 152 belongs in a different shardspace. Each shardspace stores data that correspond to a database shard and is associated with a shardspace name identifying the shardspace and the database shard.

In an embodiment, pseudocolumns may be associated with externally sharded tables (e.g., federated tables such as T1 and T2 in FIG. 2). A pseudocolumn for an externally sharded table is ora_shard_space_name and is used to identify which shardspace the externally sharded table belongs to. Unlike a shard key, a pseudocolumn is not an actual column. Rather, a pseudocolumn behaves like a table column but is not stored or materialized in tables. The externally sharded tables may be referred to here as keyless sharded tables.

Queries referencing externally sharded tables will run across database shards. However, to run a query on a given database shard, a query may include a predicate identifying a particular shardspace by its associated shardspace name.

In an embodiment, queries referencing federated tables (e.g., T1 and T2 in FIG. 2) in database shards are not routed based on shard keys. Rather, queries referencing federated tables in database shards are routed based on pseudocolumns identifying shardspaces.

Database Dictionary

A database dictionary provides information about databases. For example, a database dictionary may define the shard catalog and may define names of schema objects, such as synonyms. A synonym is an alternative name for referencing objects such as tables, views, sequences, stored procedures, other database objects, and other aspects of these objects. A synonym may be added to a database shard as part of preparing the database shard to support a table shard for a sharded table.

Sharded Table Resolution

A sharded table resolution is a process that integrates federated tables in database shards of a federated sharded database as table shards of a sharded table and that creates a table definition of the sharded table that mirrors those of federated tables.

Federated tables with the same table name may be integrated as table shards of a sharded table. Federated tables with different table names may be integrated as table shards of a sharded table when the names are synonymous, as defined by corresponding database shards. Federated tables with different table names may be integrated as table shards of a sharded table when tables descriptions for the federated tables includes comments that indicate the federated tables as being integrable as table shards of a sharded table.

The table definition of a sharded table defines a global table name for a sharded table, which may be one that matches the table names of federated tables or may be one that matches a synonym defined by database shards. Similarly, a particular column in a sharded table has a global column name that may match the column names of respective columns or a synonym for the column names defined by the database shards.

Global Schema

In a bottom-up fashion, the shard catalog server imports the existing local schemas of existing databases that have become database shards in a federated sharded database and synchronizes the existing local schemas to create a global schema. The global schema may be stored in a database dictionary.

During the synchronization, the shard catalog server resolves differences in the local schemas when creating the global schema. Differences may be in one or more of the existing databases having more or less database objects or having different table definitions.

When differences involve database objects, the shard catalog server may be configured to apply an intersection such that only those objects that exists on all the database shards are created in the global schema. Alternatively, the shard catalog server may be configured to apply a union such that all objects are created in the global schema.

Table definitions for federated tables differ when a table name is different, when a column name is different, when a number of columns is different, when a column type is different, when a constraint definition is different, or when a default value of a column is different.

When table names and/or column names are different, the shard catalog server may be configured to use the sharded table resolution process described above, to integrate federated tables as table shards of a sharded tables. It is also possible to add an application-specific module to specify the rules for how to integrate the local schemas into the global schema.

After the shard catalog server integrates the federated tables as tables shards of a sharded table, the shard catalog server resolves differences relating to differences in the number of columns and column datatypes.

When a number of columns is different, the shard catalog server may be configured to either use an intersection of all the columns or take the union of all the columns. When a column type is different, the shard catalog server may be configured to take the highest datatype as the target datatype that encompasses the different datatypes of these columns. The shard catalog server may keep the constraint if it is defined on all of the database shards. The shard catalog server may keep the default value only if it is the same on all of the database shards.

In an embodiment, the shard catalog server may create views on the database shards to encapsulate the differences in table definitions in the database shards and in the shard catalog. CSQ (correlated subquery) processing will replace any reference to a table with a reference to the corresponding view. This requires the creation of views in the existing databases.

In another embodiment, the shard catalog server may create a heterogeneity map (table, column, database shard) for the columns that either do not exist on a given database shard or have different datatypes. For datatypes that are different, the heterogeneity map (table, column, database shard) will contain the expression that needs to run to convert the column value. For non-existing columns on the database shards, the heterogeneity map will contain a default value. CSQ processing will replace any reference to a table with a reference to a derived table (inline view) built on the fly using the heterogeneity map.

In yet another embodiment, the shard catalog server may identify those columns that either do not exist on a given table shard or have different datatypes as being heterogenous columns in the global schema. The shard catalog server may wrap a built-in handler function around the heterogeneous columns before queries are run on database shards. In other words, the shard catalog server may rewrite queries to include the handler function in place of the heterogeneous column. When the handler function is invoked at a database shard, the database shard will return an appropriate value to the shard catalog server. For example, a database shard may return a default value (e.g., a null value) if the column does not exist on the database shard and may return a converted value if the column does exist but its datatype (source datatype) is different from the datatype (target datatype) indicated in the global schema.

The global schema defines global table identifiers for sharded tables (e.g., table names), global column identifiers for columns (e.g., column names), and global datatypes for columns.

Federated tables that have the same or similar schema but different contents are automatically identified as "externally" sharded, while federated tables that have the same schema and same content across the database shards are automatically identified as "externally" duplicated, in the global schema. However, if the characteristic of a table needs to be changed (e.g., from externally duplicated to externally sharded, or from externally sharded to externally duplicated), an alter table DDL command can be run in the shard catalog server to change the characteristic of that table.

Creating a Sharding Environment from Existing Independent Databases Example

Figure 3:
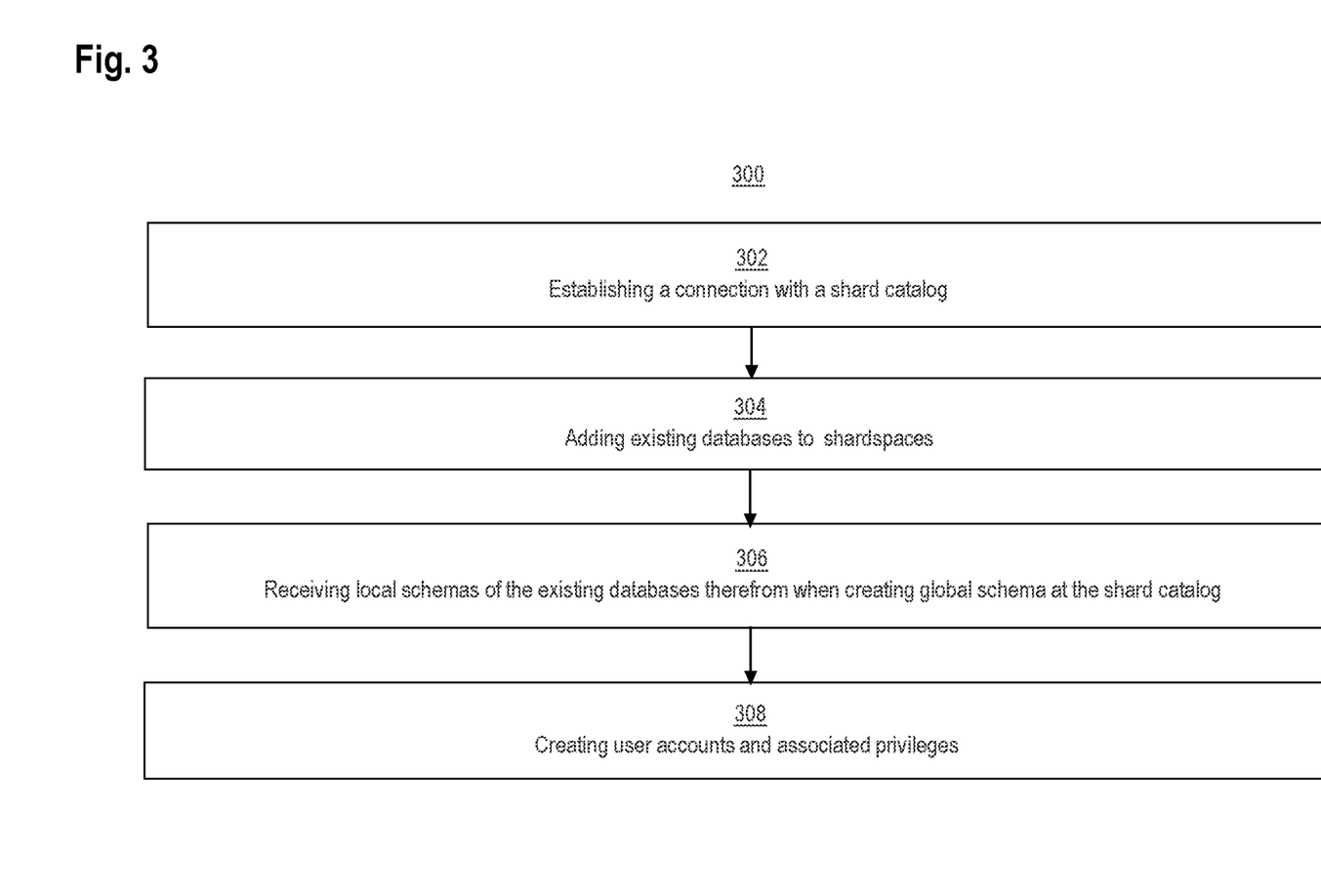
FIG. 3 illustrates an example flow diagram for creating a single sharding environment from existing independent databases, according to one embodiment.

FIG. 3 illustrates an example flow diagram 300 for creating a single sharding environment from existing independent databases, according to one environment. At step 302, a connection with a shard catalog is established. A shard catalog includes a database that supports automated shard deployment, centralized management of a sharded database, and multi-shard queries.

In an embodiment, the shard catalog is established using a create shard catalog command at a shard catalog server. In response to the create shard catalog command, the shard catalogue server provides a connection string to the shard catalog. The connection string allows for the connection with the shard catalog to be established. In response to establishing the connection, the shard catalog server begins to initialize tables and parameters in the shard catalog that are necessary for creating a federated sharded database.

At step 304, existing databases are added to shardspaces. Prior to step 304, existing databases are independent, unsharded databases that have been previously created in co-located or geographically distributed regions. Step 304 begins the integration of the existing databases as database shards of the federated sharded database and the integration of federated tables as table shards of sharded table(s). The shard catalog server registers the existing databases and maintains information relating to the layout of the existing databases in a global schema.

In an embodiment, shardspaces are defined for the database shards. When the existing databases are being integrated as database shards, the existing databases and their federated tables are added to corresponding shardspaces.

In an embodiment, a pseudocolumn is used to identify which shardspace federated tables (e.g., externally sharded tables) belong to. In an embodiment, this pseudocolumn is called ora_shardspace_name. Unlike shard keys, which are part actual columns in tables, the pseudocolumn is not an actual column but behaves like a table column and can be used for routing queries to one or more database shards.

At step 306, once the existing databases (and their replicas) are added to the shardspaces, the shard catalog server receives local schemas of the existing databases therefrom for synchronization when creating the global schema at the shard catalog.

In an embodiment, a synchronize SCHEMA command starts the schema synchronization. In response to the synchronize SCHEMA command, the shard catalog server imports the local schemas from the database shards and integrates them in the global schema. In an embodiment, this synchronization is referred to as "bottom up" schema synchronization as local schemas are propagated up from the database shards to the shard catalog server.

In an embodiment, the shard catalog server may be configured to perform a sharded table resolution process to integrate federated tables as table shards of a sharded table. The shard catalog server may resolve differences in table names and column names by referring to a database dictionary and/or table comments.

In an embodiment, the shard catalog server may be configured to further resolve local schema differences relating to the number of columns and column datatypes. The shard catalog may resolve differences in table definitions by indicating these columns as being heterogeneous and rewrite queries that reference any heterogeneous columns as shard queries such that when the rewritten queries or shard queries are run on the database shards, the database shards return appropriate values to the shard catalog server.

The creation of the global schema results in the existing databases becoming database shards that together form a federated sharded database in a single sharding environment.

At step 308, the shard catalog server creates user accounts and associated privileges, and provides the user accounts and associated to all the database shards. In an embodiment, once the synchronize SCHEMA command is successful and the existing databases are registered with the shard catalog server, the shard catalog server creates users accounts according to associated privileges on all database shards. This is referred to "top down" schema synchronization as the user accounts are created at the shard catalog server and propagated down to all the database shards. The user accounts are granted access to all externally sharded tables and externally duplicated tables. In an embodiment, the shard catalog server is associated with a user account and is granted access to each of the database shards.

Queries

Cross shard queries are run from one or more of the shard catalog servers. Queries issued to the DBMS shards reference a table shard by the table name of the sharded table defined by the global schema and reference the columns of the table shard by the column names defined by the global schema for the sharded table. The table name or column name in the queries should resolve to a table name or column name of the table shard or synonym of either the table name or column name of the sharded table. In the shard catalog server, queries referencing externally sharded tables will run across all database shards. Externally sharded tables may have a pseudocolumn associated with them. To run a query on a particular database shard, a query can be filtered with a predicate ora_shardspace_name=<shardspace_name_shard_belongs_to>.

For example, for a query such as "SELECT CUST_NAME, CUST_ID FROM CUSTOMER", where the table CUSTOMER is marked as externally sharded, the query will run on all database shards.

For another example, for a query such as "SELECT CUST_NAME, CUST_ID FROM CUSTOMER WHERE ora_shardspace_name='ASIA'", the query will run on one of the database shards belonging to the shardspace name ASIA.

Joining externally sharded tables from different shardspaces may be performed. For example, to determine which customers from shardspace EUROPE having orders in shardspace ASIA, the following query may be executed: "SELECT ORDER_ID, CUSTOMER_NAME FROM CUSTOMERS C, ORDERS O WHERE C.CUST_ID=O.CUST_ID AND C.ORA_SHARDSPACE_NAME='EUROPE' AND O.ORA_SHARDSPACE_NAME='ASIA'".

In an embodiment, for a query referencing an externally duplicated table with or without an ora_shardspace_name predicate, the query will run on one of the database shards.

In an embodiment, for a query referencing an externally duplicated table without an ora_shardspace_name predicate, the query will run on the shard catalog.

As discussed elsewhere herein, the shard catalog identifies all heterogenous columns in the global schema such that the shard catalog server is able to wrap the built-in handler function around the heterogenous columns before queries referencing those columns are sent to the shards. In an embodiment, the function may receive as inputs a target datatype and a heterogeneous column.

For example, for "SELECT CUST_ID, NAME, COUNTRY_CODE FROM CUSTOMER", with CUST_ID and COUNTRY_CODE being heterogenous, a query send to the database shards would be: "SELECT SHD$COL$MAP (VARCHAR(20), CUST_ID, NULL), NAME, SHD$COL$MAP(NUMBER, COUNTRY_CODE, NULL) FROM CUSTOMER".

Cross Shard Querying Example

Figure 4:
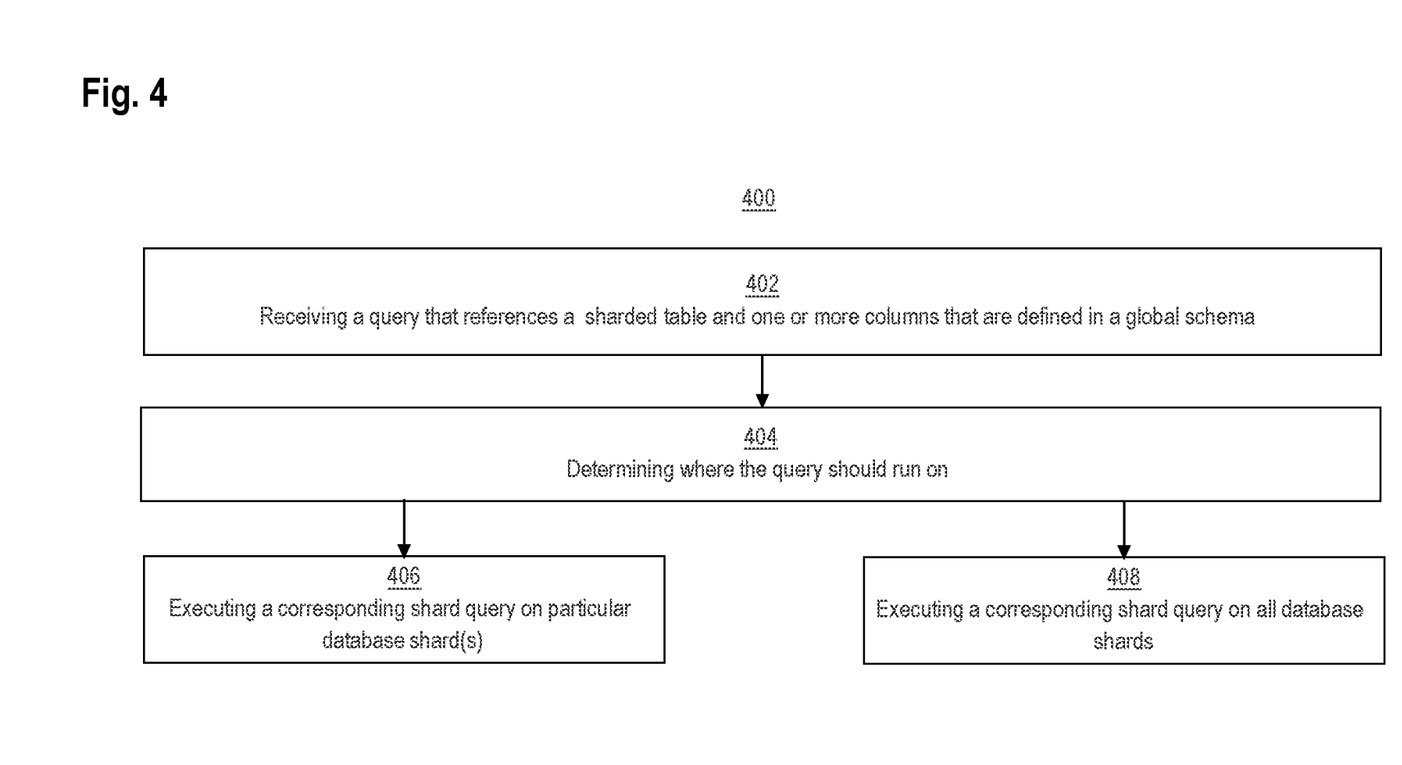
FIG. 4 illustrates an example flow diagram for a cross shard query routing, according to one embodiment.

FIG. 4 illustrates an example flow diagram 400 for a cross shard query routing, according to one embodiment. At step 402, a shard catalog server receives a query that references a sharded table and one or more columns that are defined in a global schema. A sharded table comprises a plurality of externally sharded tables on a plurality of database shards in a federated sharded database.

At step 404, the shard catalog server determines where the query should run on. For example, the shard catalog server may determine to run the query on a particular database shard or on all database shards based on whether the query includes a predicate ora_shardspace_name=<shardspace_name_shard_belongs_to>.

If it is determined at step 404 that the query includes a predicate identifying or referencing a particular shardspace as a pseudocolumn, then a corresponding shard query will be routed to the database shard associated with the identified shardspace for execution at step 406. If it is determined at step 404 that the query does not include a predicate identifying or referencing a particular shardspace as a pseudocolumn, then a corresponding shard query will be routed to each database shards for execution at step 408.

In an embodiment, a shard query may be the same as the original query received by the shard catalog server, or may be a modified query or may be a fragmented portion of the query received by the shard catalog, that can be executed by database shards. The shard query references the same columns as referenced in the query received by the shard catalog at step 402. For example, when a query references a heterogeneous column, the shard catalog server rewrites the query to include the built-in handler function in place of the heterogeneous column before the rewritten query is run on the database shards.

In an embodiment, each database shard executing a shard query may be configured to refer to a database dictionary to determine which one or more columns are being referenced in the shard query. For example, a database shard may determine that the CUSTOMER ID column referenced in a shard query refers to PATRON ID column in its table shard because the term "customer" and the term "patron" are synonymous.

In an embodiment, if a column referenced in the shard query does not exist in the database shard, the database shard is configured to return a default value. An example default value is a null value.

In an embodiment, each database shard executing a shard query may be configured to convert one or more source datatypes associated with the one or more columns referenced in the shard query to corresponding one or more global target datatypes identified in the global schema.

As discusses elsewhere herein, the shard catalog does not keep track of all mappings of all datatypes of all columns in the sharded table. Rather, the shard catalog keeps track of which columns are heterogeneous and only instructs, via the built-in handler function, database shards to return a default value or to perform datatype conversions for those heterogeneous columns.

User-Defined Tables

Similar to creating users at the shard catalog server, user-defined tables can also be created at the shard catalog server and propagated down to the database shards. User-defined tables in a federated sharded database are created using functionalities of a sharded database.

An example of a user-defined table created at the shard catalog server is a user-defined sharded table. Column names, datatypes, and partition may be specified when creating a user-defined table. In addition, a user-defined sharded table may be associated with sharding keys. Sharding keys have uniqueness across all shards of the user-defined sharded table. Sharding keys are used to route queries referencing user-defined sharded tables. In contrast to user-defined sharded tables, sharding keys are not used to route queries referencing externally sharded tables. Instead, as discussed elsewhere herein, pseudocolumns are used to route queries referencing externally sharded tables.

Another example of a user-defined table created at the shard catalog server is a user-defined duplicated table. A user-defined duplicated table has the same content on every database shard.

Creating a Sharding Environment from Federated Tables in a Sharded Database Example In an embodiment, a new sharding environment may be created to integrate federated tables on an existing sharded database. The sharded database comprises a plurality of database shards that each includes partitions of a sharded table. Using the techniques described above, the federated tables on the database shards can be integrated in a new sharding environment to form another sharded table.

Figure 5:
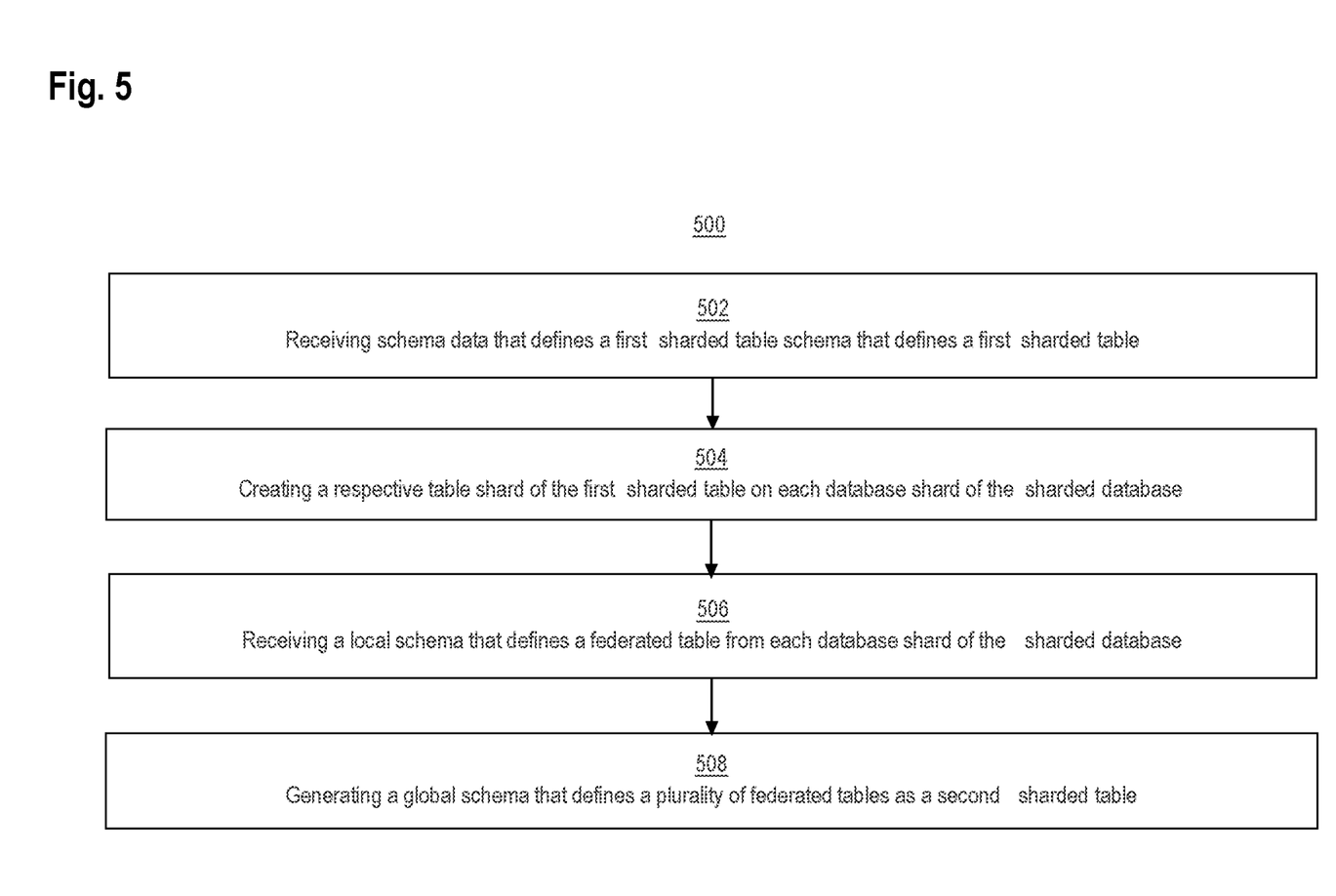
FIG. 5 illustrates an example flow diagram for creating a new sharding environment from federated tables in an existing sharded database, according to one embodiment.

FIG. 5 illustrates an example flow diagram 500 for creating a new sharding environment from federated tables in an existing sharded database, according to one embodiment. At step 502, a shard catalog server receives schema data that defines a first sharded table schema that defines a first sharded table.

At step 504, in response to receiving the first sharded table schema, the shard catalog creates a respective table shard of the first sharded table on each database shard of the sharded database.

Each database shard of the sharded database includes a federated table of a plurality of federated tables. Unlike a sharded table, a federated table is a table that is not been partitioned from another table.

At step 506, for each database shard of a plurality of database shards, the shard catalog receives local schema that defines a federated table included in a respective database shard.

In response to receiving all local schemas defining the federated tables included in the database shards, at step 508, the shard catalog server generates a global schema that defines the plurality of federated tables as a second sharded table using the techniques described herein.

Once the global schema is created, the new sharding environment including the previously federated tables, may issue cross shard queries, create "on all shards" new objects, and create and "on all shards" new user accounts that will have permission to access the data across all database shards.

The shard catalog server routes queries referencing the federated tables in the database shards to one or more of the database shards without shard keys. Rather, queries referencing the federated tables in the database shards are routed to one or more of the database shards using pseudocolumns identifying shardspaces.

Differences and Advantages

A difference from the prior industry solutions for database federation is that embodiments of federation described herein are done within the framework of a sharded database. Since existing databases become shards, customers are able to use functionalities of the sharded database, such as the ability to create sharded and duplicated objects, in addition to the objects imported from the existing databases. This provides a combination of centralized administration of data with local autonomy of component databases.

A federated sharded database provide a global view of data across geographic regions and provides an ability to perform cross-region data analytics, even when there are minor differences in the application schema between the existing databases. Tolerance to differences in the application schema means that an application upgrade can be independently performed on one or more shards, which is a major benefit for many customers.

For applications that do not require autonomy of existing databases, the federated sharded database provides centralized creation of sharded and duplicated objects in addition to objects that existed in the databases prior to federation. Users can also move data from federated tables to sharded and duplicated tables. Data in sharded tables can be split and moved between shards and data in duplicated tables is automatically synchronized. As can be appreciated, the shards can be running different releases of the same DBMS system. In fact, the shards can also be running different DBMS systems. Example different DBMS systems include Oracle, Sybase, and Microsoft SQL Server,

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g., Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g., work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e., can be created or terminated by the database server) and perform various database server functions. Database processes include processes running within a database session established for a client.

A database process is a unit of execution. A database process can be an computer system process or thread or a user defined execution context such as a user thread or fiber. Database processes may also include "database server system" processes which provide services and/or perform functions on behalf of entire database server. Such database server system processes include listeners, garbage collectors, log writers, and recovery processes.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return datatype and the datatypes of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e., java file) and the compiled version of the class (i.e., class file).

Query Optimization and Execution Plans

Query optimization generates one or more different candidate execution plans for a query, which are evaluated by the query optimizer to determine which execution plan should be used to compute the query.

Execution plans may be represented by a graph of interlinked nodes, referred to herein as operators or row sources, that each corresponds to a step of an execution plan, referred to herein as an execution plan operation. The hierarchy of the graphs (i.e., directed tree) represents the order in which the execution plan operations are performed and how data flows between each of the execution plan operations. An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e., one for which a potentially more efficient and less costly execution plan can be generated. Examples of query transformation include view merging, subquery unnesting, predicate move-around and push-down, common subexpression elimination, outer-to-inner join conversion, materialized view rewrite, and star transformation.

Hardware Overview

Figure 6:
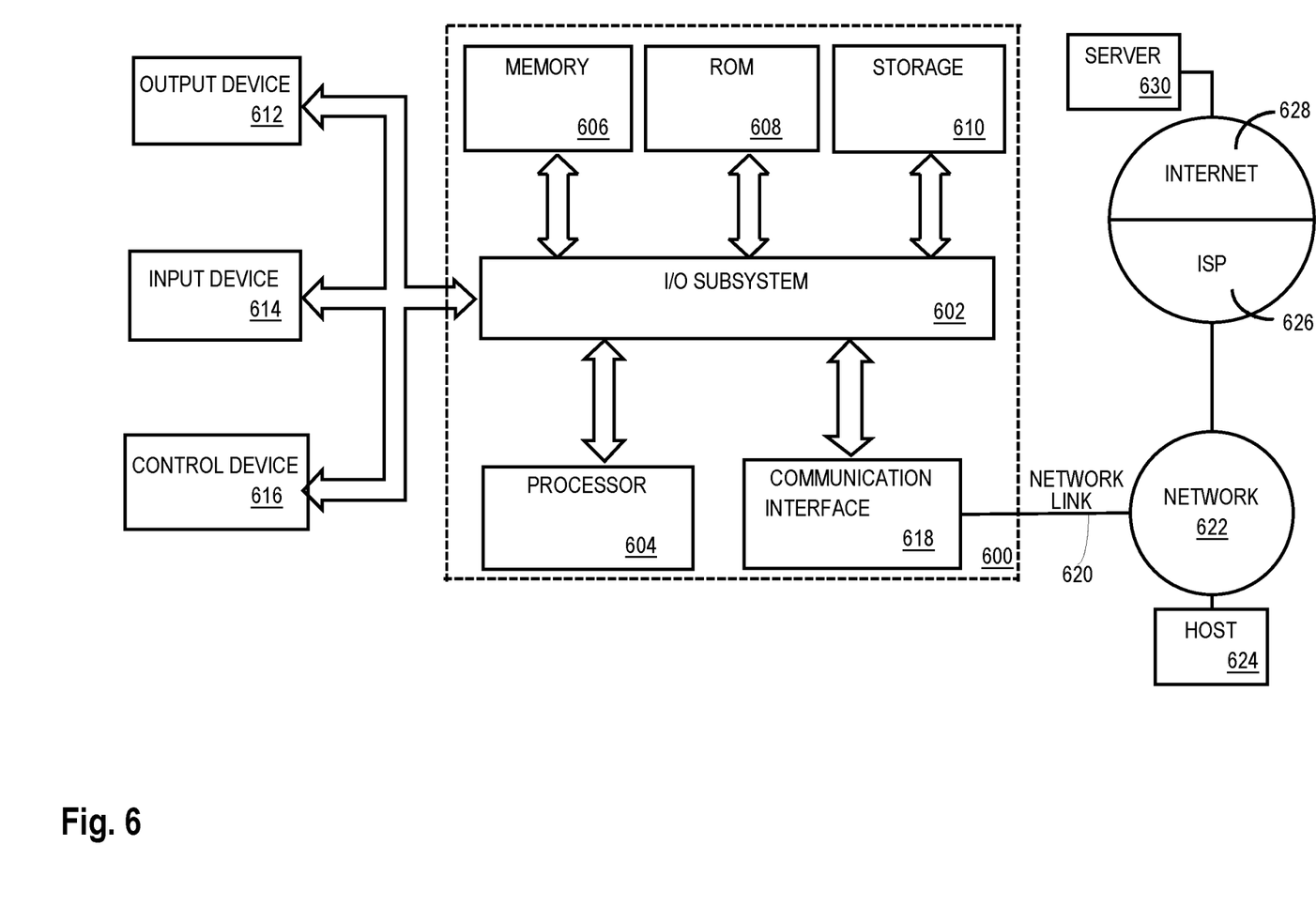
FIG. 6 illustrates a block diagram of a computing device in which the example embodiment(s) of the present invention may be embodiment.

Referring now to FIG. 6, it is a block diagram that illustrates a basic computing device 600 in which the example embodiment(s) of the present invention may be embodied. Computing device 600 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 600 may include a bus 602 or other communication mechanism for addressing main memory 606 and for transferring data between and among the various components of device 600.

Computing device 600 may also include one or more hardware processors 604 coupled with bus 602 for processing information. A hardware processor 604 may be a general purpose microprocessor, a system on a chip (SoC), or other processor.

Main memory 606, such as a random access memory (RAM) or other dynamic storage device, also may be coupled to bus 602 for storing information and software instructions to be executed by processor(s) 604. Main memory 606 also may be used for storing temporary variables or other intermediate information during execution of software instructions to be executed by processor(s) 604.

Software instructions, when stored in storage media accessible to processor(s) 604, render computing device 600 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 600 also may include read only memory (ROM) 608 or other static storage device coupled to bus 602 for storing static information and software instructions for processor(s) 604.

One or more mass storage devices 610 may be coupled to bus 602 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 610 (e.g., the main hard disk for the device) stores a body of program and data for directing operation of the computing device, including an operating system, user application programs, driver and other support files, as well as other data files of all sorts.

Computing device 600 may be coupled via bus 602 to display 612, such as a liquid crystal display (LCD) or other electronic visual display, for displaying information to a computer user. In some configurations, a touch sensitive surface incorporating touch detection technology (e.g., resistive, capacitive, etc.) may be overlaid on display 612 to form a touch sensitive display for communicating touch gesture (e.g., finger or stylus) input to processor(s) 604.

An input device 614, including alphanumeric and other keys, may be coupled to bus 602 for communicating information and command selections to processor 604. In addition to or instead of alphanumeric and other keys, input device 614 may include one or more physical buttons or switches such as, for example, a power (on/off) button, a "home" button, volume control buttons, or the like.

Another type of user input device may be a cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

While in some configurations, such as the configuration depicted in FIG. 6, one or more of display 612, input device 614, and cursor control 616 are external components (i.e., peripheral devices) of computing device 600, some or all of display 612, input device 614, and cursor control 616 are integrated as part of the form factor of computing device 600 in other configurations.

Functions of the disclosed systems, methods, and modules may be performed by computing device 600 in response to processor(s) 604 executing one or more programs of software instructions contained in main memory 606. Such software instructions may be read into main memory 606 from another storage medium, such as storage device(s) 610. Execution of the software instructions contained in main memory 606 cause processor(s) 604 to perform the functions of the example embodiment(s).

While functions and operations of the example embodiment(s) may be implemented entirely with software instructions, hard-wired or programmable circuitry of computing device 600 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more software instructions to processor(s) 604 for execution. For example, the software instructions may initially be carried on a magnetic disk or solid-state drive of a remote computer. The remote computer can load the software instructions into its dynamic memory and send the software instructions over a telephone line using a modem. A modem local to computing device 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor(s) 604 retrieves and executes the software instructions. The software instructions received by main memory 606 may optionally be stored on storage device(s) 610 either before or after execution by processor(s) 604.

Computing device 600 also may include one or more communication interface(s) 618 coupled to bus 602. A communication interface 618 provides a two-way data communication coupling to a wired or wireless network link 620 that is connected to a local network 622 (e.g., Ethernet network, Wireless Local Area Network, cellular phone network, Bluetooth wireless network, or the like). Communication interface 618 sends and receives electrical, electromagnetic, or optical signals that carry digital data streams representing various types of information. For example, communication interface 618 may be a wired network interface card, a wireless network interface card with an integrated radio antenna, or a modem (e.g., ISDN, DSL, or cable modem).

Network link(s) 620 typically provide data communication through one or more networks to other data devices. For example, a network link 620 may provide a connection through a local network 622 to a host computer 624 or to data equipment operated by an Internet Service Provider (ISP) 626. ISP 626 in turn provides data communication services through the world wide packet data communication network now commonly referred to as the "Internet" 628. Local network(s) 622 and Internet 628 use electrical, electromagnetic or optical signals that carry digital data streams. The signals through the various networks and the signals on network link(s) 620 and through communication interface(s) 618, which carry the digital data to and from computing device 600, are example forms of transmission media.

Computing device 600 can send messages and receive data, including program code, through the network(s), network link(s) 620 and communication interface(s) 618. In the Internet example, a server 630 might transmit a requested code for an application program through Internet 628, ISP 626, local network(s) 622 and communication interface(s) 618.

The received code may be executed by processor 604 as it is received, and/or stored in storage device 610, or other non-volatile storage for later execution.

Software Overview

Figure 7:
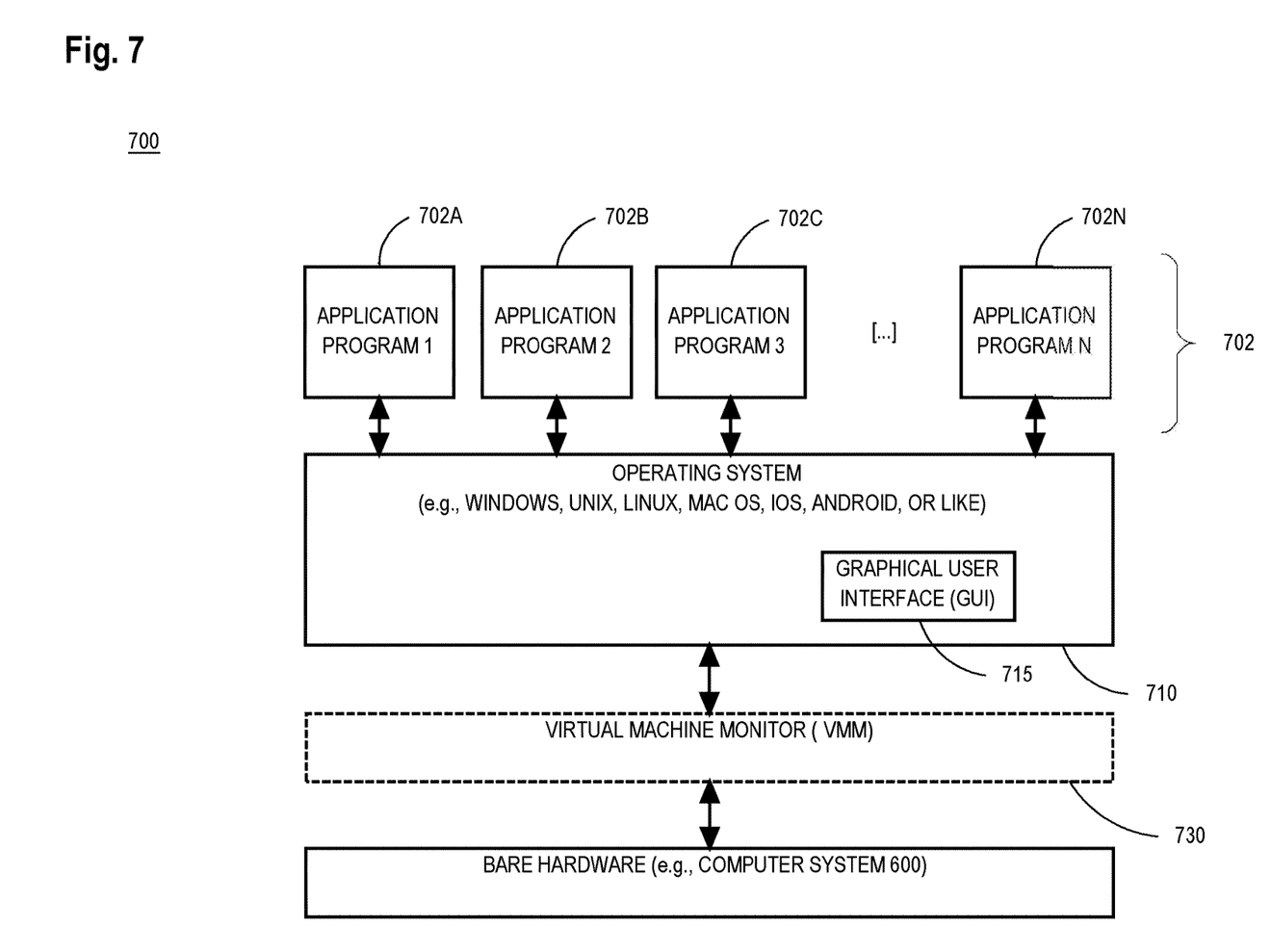
FIG. 7 illustrates a block diagram of a basic software system for controlling the operation of a computing device.

FIG. 7 is a block diagram of a basic software system 700 that may be employed for controlling the operation of computing device 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing device 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on device 700 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of device 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the device 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of device 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method, comprising:
a shard catalog server receiving schema data that defines a first sharded table schema that defines a first sharded table;
in response to receiving said first sharded table schema, said shard catalog server creating a respective table shard of said first sharded table on each database shard of a sharded database, wherein each database shard is hosted by a respective DBMS shard of a plurality of DBMS shards;
wherein each DBMS shard of said plurality of DBMS shards includes a respective federated table of a plurality of federated tables;
for each DBMS shard of said plurality of DBMS shards, said shard catalog server receiving a respective local schema defining the respective federated table included in said each DBMS shard;
said shard catalog server generating, based on synchronizing local schemas for said plurality of DBMS shards, a global schema defining said plurality of federated tables as a second sharded table;
said global schema defines a plurality of columns for said second sharded table.

2. The method of claim 1, further comprising:
said shard catalog server receiving a particular query that references said second sharded table and one or more columns of said plurality of columns;
executing said particular query, wherein executing said particular query includes:
at least one of said plurality of DBMS shards executing a respective shard query against a respective federated table included in said at least one of said plurality of DBMS shards, said respective shard query referencing each of said one or more columns.

3. The method of claim 2, wherein said global schema defines a shardspace name of each DBMS shard of said plurality of DBMS shards that identifies said each DBMS shard.

4. The method of claim 3,
wherein said particular query includes a predicate referencing a particular shardspace name as pseudocolumn, said pseudocolumn not being materialized in any federated table of said plurality of federated tables, said particular shardspace name identifying a particular DMBS shard of said at least one of said plurality of DBMS shards;
wherein, in response to said particular query including said predicate, the particular DMBS shard executing the respective shard query.

5. The method of claim 2, wherein said global schema defines a global datatype for each of said plurality of columns for said second sharded table.

6. The method of claim 5,
wherein said respective shard query includes a predicate referencing one or more global datatypes defined in said global schema for said one or more columns;
wherein, in response to said respective query including said predicate, said at least one of said plurality of DBMS shards converting one or more source datatypes associated with said one or more columns to said one or more global datatypes.

7. The method of claim 2, wherein generating said global schema comprises said shard catalog server tracking any columns of said plurality of columns that are heterogeneous.

8. The method of claim 2, wherein generating said global schema comprises said shard catalog server tracking corresponding columns from said plurality of columns that are associated with different datatypes.

9. The method of claim 2, wherein generating said global schema comprises said shard catalog server tracking any columns from said plurality of columns of said second sharded table that does not have a corresponding column in a particular federated table of said plurality of federated tables.

10. The method of claim 1, further comprising said shard catalog server routing queries referencing one or more of said plurality of federated tables, to one or more of said plurality of DBMS shards without shard keys.

11. The method of claim 1, further comprising:
said shard catalog server creating user accounts and associated privileges and granting said user accounts access to said plurality of federated tables according to said privileges;
said shard catalog server granting itself as a user account, with access to each of said plurality of federated tables.

12. The method of claim 1, wherein generating said global schema includes receiving integration rules for integration of received local schemas into the global schema.

13. The method of claim 1, wherein said plurality of DBMS shards run on one or more different releases of a same DBMS.

14. The method of claim 1, wherein said plurality of DBMS shards run on one or more different DBMSs from different vendors.

15. One or more non-transitory computer-readable storage media storing one or more sequences of computer-executable instructions, which when executed by one or more computing devices, cause:
   a shard catalog server receiving schema data that defines a first sharded table schema that defines a first sharded table;
   in response to receiving said first sharded table schema, said shard catalog server creating a respective table shard of said first sharded table on each database shard of a sharded database, wherein each database shard is hosted by a respective DBMS shard of a plurality of DBMS shards;
   wherein each DBMS shard of said plurality of DBMS shards includes a respective federated table of a plurality of federated tables;
   for each DBMS shard of said plurality of DBMS shards, said shard catalog server receiving a respective local schema defining the respective federated table included in said each DBMS shard;
   said shard catalog server generating, based on synchronizing local schemas for said plurality of DBMS shards, a global schema defining said plurality of federated tables as a second sharded table;
   said global schema defines a plurality of columns for said second sharded table.

16. The one or more non-transitory computer-readable storage media of claim 15, wherein the one or more sequences of the computer-executable instructions, which when executed by the one or more computing devices, further cause:
   said shard catalog server receiving a particular query that references said second sharded table and one or more columns of said plurality of columns;
   executing said particular query, wherein executing said particular query includes:
      at least one of said plurality of DBMS shards executing a respective shard query against a respective federated table included in said at least one of said plurality of DBMS shards, said respective shard query referencing each of said one or more columns.

17. The one or more non-transitory computer-readable storage media of claim 16, wherein said global schema defines a shardspace name of each DBMS shard of said plurality of DBMS shards that identifies said each DBMS shard.

18. The one or more non-transitory computer-readable storage media of claim 17,
   wherein said particular query includes a predicate referencing a particular shardspace name as pseudocolumn, said pseudocolumn not being materialized in any federated table of said plurality of federated tables, said particular shardspace name identifying a particular DMBS shard of said at least one of said plurality of DBMS shards;
   wherein the one or more sequences of the computer-executable instructions, which when executed by the one or more computing devices, further cause; in response to said particular query including said predicate, the particular DMBS shard executing the respective shard query.

19. The one or more non-transitory computer-readable storage media of claim 16, wherein said global schema defines a global datatype for each of said plurality of columns for said second sharded table.

20. The one or more non-transitory computer-readable storage media of claim 19,
   wherein said respective shard query includes a predicate referencing one or more global datatypes defined in said global schema for said one or more columns;
   wherein the one or more sequences of the computer-executable instructions, which when executed by the one or more computing devices, further cause; in response to said respective query including said predicate, said at least one of said plurality of DBMS shards converting one or more source datatypes associated with said one or more columns to said one or more global datatypes.

21. The one or more non-transitory computer-readable storage media of claim 16, wherein generating said global schema comprises said shard catalog server tracking any columns of said plurality of columns that are heterogeneous.

22. The one or more non-transitory computer-readable storage media of claim 16, wherein generating said global schema comprises said shard catalog server tracking corresponding column from said plurality of columns that are associated with different datatypes.

23. The one or more non-transitory computer-readable storage media of claim 16, wherein generating said global schema comprises said shard catalog server tracking any columns from said plurality of columns of said second sharded table that does not have a corresponding column in a particular federated table of said plurality of federated tables.

24. The one or more non-transitory computer-readable storage media of claim 15, wherein the one or more sequences of the computer-executable instructions which, when executed by the one or more computing devices, further cause said shard catalog server routing queries referencing one or more of said plurality of federated tables, to one or more of said plurality of DBMS shards without shard keys.

25. The one or more non-transitory computer-readable storage media of claim 15, wherein the one or more sequences of the computer-executable instructions which, when executed by the one or more computing devices, further cause:
   said shard catalog server creating user accounts and associated privileges and granting said user accounts access to said plurality of federated tables according said privileges;
   said shard catalog server granting itself as a user account, with access to each of said plurality of federated tables.

26. The one or more non-transitory computer-readable storage media of claim 15, wherein generating said global schema includes receiving integration rules for integration of received local schemas into the global schema.

27. The one or more non-transitory computer-readable storage media of claim 15, wherein said plurality of DBMS shards run on one or more different releases of a same DBMS.

28. The one or more non-transitory computer-readable storage media of claim 15, wherein said plurality of DBMS shards run on one or more different DBMSs.

* * * * *

UNITED STATES PATENT AND TRADEMARK OFFICE
CERTIFICATE OF CORRECTION

PATENT NO. : 11,194,773 B2  
APPLICATION NO. : 16/569051  
DATED : December 7, 2021  
INVENTOR(S) : Hu et al.

Page 1 of 1

It is certified that error appears in the above-identified patent and that said Letters Patent is hereby corrected as shown below:

In the Specification

In Column 12, Line 39, delete "Server," and insert -- Server. --, therefor.

In the Claims

In Column 20, Line 27, in Claim 4, delete "DMBS" and insert -- DBMS --, therefor.

In Column 20, Line 30, in Claim 4, delete "DMBS" and insert -- DBMS --, therefor.

In Column 21, Line 63, in Claim 18, delete "DMBS" and insert -- DBMS --, therefor.

In Column 21, Line 67, in Claim 18, delete "cause;" and insert -- cause: --, therefor.

In Column 22, Line 2, in Claim 18, delete "DMBS" and insert -- DBMS --, therefor.

In Column 22, Line 15, in Claim 20, delete "cause;" and insert -- cause: --, therefor.

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*